US008971516B1

(12) United States Patent
Blatteau, Jr. et al.

(10) Patent No.: US 8,971,516 B1
(45) Date of Patent: *Mar. 3, 2015

(54) UNIFIED RECOVERY SYSTEM COMMUNICATION HISTORY TRACKING FOR PAYMENTS IN ARREARS

(71) Applicant: Bank of America Corporation, Charlotte, NC (US)

(72) Inventors: Michael John Blatteau, Jr., Townsend, DE (US); Michael D. Fleischer, Double Oak, TX (US); Ryan Scott Heller, Middletown, DE (US); Hudson Philip Hoen, IV, Wilmington, DE (US); Sethu Iyer, Kennett Square, PA (US); Hari Madala, Pittsburgh, PA (US); Patrick B. Smith, Garland, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,663

(22) Filed: Nov. 5, 2013

(51) Int. Cl.
*H04M 3/00* (2006.01)
*H04M 5/00* (2006.01)
*H04M 3/51* (2006.01)

(52) U.S. Cl.
CPC ...... *H04M 3/5133* (2013.01); *H04M 2203/408* (2013.01)
USPC ............ 379/265.01; 379/265.02; 379/265.11; 379/266.01; 379/201.01

(58) Field of Classification Search
USPC ............ 379/201.01, 265.01, 265.02, 265.11, 379/266.01; 705/309
See application file for complete search history.

(56) References Cited

U.S. PATENT DOCUMENTS

2011/0035268 A1* 2/2011 Rossi ......................... 705/14.17
2013/0332352 A1* 12/2013 Imrey et al. .................... 705/40

* cited by examiner

*Primary Examiner* — Quynh Nguyen
(74) *Attorney, Agent, or Firm* — Michael A. Springs; Moore & Van Allen PLLC; Nicholas C. Russell

(57) ABSTRACT

Embodiments of the invention are directed to a system, method, or computer program product for providing a unified representation of all customer relationships with an entity. This representation focuses on customer products in arrears that are to be recovered. The invention presents automatic communication history tracking to aid in providing an overarching view of all customer relationships to a representative. This automatic communication history tracking monitors all communications, manual or automatic, incoming or outgoing. The tracking monitors the date, time, disposition, and the like of all customer communications. As such, the invention allows the representative to make decision and take appropriate actions immediately based on the entire relationship, including customer communication history. The invention takes this information and incorporates it with all of the customer's relationships and external factors to provide a holistic customer service experience for a customer with accounts in arrears.

22 Claims, 13 Drawing Sheets

| MANAGEMENT GROUP | | | | | |
|---|---|---|---|---|---|

CUSTOMERS — 602

| CUSTOMER NAME | TYPE |
|---|---|
| NAME 1 | PRIMARY |
| NAME 2 | PRIMARY |
| NAME 3 | PRIMARY |
| NAME 4 | SECONDARY |
| NAME 5 | GUARANTOR |

606

PRIMARY CONTACT PHONE NUMBERS — 604

| TYPE | PHONE NUMBER | SOURCE | Acct# |
|---|---|---|---|
| HOME | | CREDIT CARD | ACCT |
| VACATION | | | |
| CELL | | | |
| HOME | | | |
| VACATION | | | |
| CELL | | | |
| HOME | PHONE NUMBER # | COMMERCIAL | ACCT |
| WORK | | | |
| VACATION | | | |
| CELL | | | |

CUSTOMER UNDERLYING CIRCUMSTANCE — 610

DATE; TIME; COMMENTS

[ OK ] [ CANCEL ]

RELATIONSHIP ACCOUNTS — 608

| CUSTOMER 1 | RELATIONSHIP<br>LEAD ACCOUNT | BALANCE<br>PAST DUE | LAST PAY<br>DATE<br>AMOUNT: _____ | DOP<br>Gov't Id:<br>STATUS: |
|---|---|---|---|---|
| CUSTOMER 2 | RELATIONSHIP<br>LEAD ACCOUNT | BALANCE<br>PAST DUE | LAST PAY<br>DATE<br>AMOUNT: _____ | DOP<br>Gov't Id:<br>STATUS: |
| CUSTOMER 3 | RELATIONSHIP<br>LEAD ACCOUNT | BALANCE<br>PAST DUE | LAST PAY<br>DATE<br>AMOUNT: _____ | DOP<br>Gov't Id:<br>STATUS: |
| CUSTOMER 4 | RELATIONSHIP | BALANCE<br>PAST DUE | LAST PAY<br>DATE<br>AMOUNT: _____ | DOP<br>Gov't Id:<br>STATUS: |
| CUSTOMER 5 | RELATIONSHIP | BALANCE<br>PAST DUE | LAST PAY<br>DATE<br>AMOUNT: _____ | DOP<br>Gov't Id:<br>STATUS: |

| WORK | SEARCH | ACCOUNT INFORMATION | ACCOUNT MAINTENANCE | CUSTOMER INFORMATION | TELEPHONY | TOOL | WEB LINKS | 1099-C FORM | DEBT MANAGEMENT |

☐ NEW EPS PAYMENT     🔍 SEARCH PAYMENT
☐ NEW DEBIT PAYMENT   💾 UPDATE CHANGES
💾 SUBMIT CHANGES
NEW PAYMENTS        EXITING PAYMENTS

804

GENERAL
- ABA NUMBER
- CHECKING A/C
- CHECKING # POSITION  ○ LEFT  ○ CENTER  ● RIGHT
- PRIMARY NAME    [NAME 1]
- SECONDARY NAME
- ADDRESS LINE 1  [ADDRESS 1]
- ADDRESS LINE 2
- CITY, STATE, ZIP  [CITY] [STATE]
- COUNTRY
- BANK NAME       [BANK NAME]
- BANK CITY, STATE [BANK CITY]
- MANAGER         [    ] EXTENSION
- TRANSPARENT     NO

FUTURE PAYMENTS - TOTAL: 0
| DATE ▼ | AMOUNT |

MESSAGE CENTER                      802
CPS ENGLISH DISCLOSURE

ACCOUNT #: ACCOUNT NUMBER

○ READ DISCLOSURE   ● DID NOT READ DISCLOSURE
PLEASE SELECT REASON   [          ▼]    ☐ SPANISH

[ACKNOWLEDGE]

PAY BY PHONE PAYMENT
| CHECK NUMBER | DATE | AMOUNT |
| ▼ | | |

OF CHECKS: 1

Figure 9

UNIFIED RECOVERY SYSTEM COMMUNICATION HISTORY TRACKING FOR PAYMENTS IN ARREARS

BACKGROUND

Customer service is a priority for merchants and other entities. When customers contact a customer service representative, the customer service representative should be able to answer the customer's questions or concerns.

For most entities with multiple products, the customer service representative may not know exactly why the customer is contacting him/her. As such, the representative may have to ask the customer several introductory questions, in order to properly answer the customer's questions or concerns. This introductory period may be time consuming. Furthermore, if the customer has follow up communications with a customer service department of an entity, the customer may have to again have to answer introductory questions on his/her follow up communication.

BRIEF SUMMARY

Embodiments of the present invention address the above needs and/or achieve other advantages by providing apparatuses (e.g., a system, computer program product and/or other devices) and methods for providing a customer service representative a unified representation of all customer relationships with respect to the entity. Specifically, the unified representation may include all accounts in arrears desired for recovery. The invention presents an overarching view of all customer relationships to a customer service representative prior to or immediately upon a customer communication. This allows the representative to make decision and take appropriate actions immediately based on the entire relationship with the customer when a customer communication is initiated.

The invention correlates all of the customer's relationships within an entity into one unified recovery system for a representative to review. In this way, the representative may be knowledgeable regarding all relationships the customer has with the entity. A relationship may include one or more accounts, loans, products, purchases, agreements, or contracts that a customer may have with the entity. Along with all customer relationships, the unified recovery system may take into consideration external factors on the communications and relationships. External factors may include laws, regulations, natural disaster occurrences, internal restrictions, or the like that may limit or prevent a customer from being contacted. As such, the invention provides a holistic customer service experience for a customer with accounts in arrears.

In some embodiments, the system may compile recovery products utilized across the entity into a single centralized unified recovery system. These recovery products may be internal or external dockets, ledgers, software, systems, or the like that are designed to initiate, monitor, and record any communication or payment associated with customer products in arrears. In this way, many different recovery products may be integrated into the one centralized unified recovery system. As such, a representative may access one centralized system to access all recovery products or systems associated with the entity.

In some embodiments, the system may compile customer relationship data. In this way, the system may compile all information that an entity may have associated with a customer. Customer relationship data may include, but is not limited to addresses and telephone numbers associated with a customer, other customer contact information, customer affiliates (such as friends, family, or the like), customer products, customer products in arrears, or other information associated with the customer's one or more accounts, loans, products, purchases, agreements, or contracts that a customer may have with the entity.

In some embodiments, the customer relationship data may be input into the unified recovery system to generate a single centralized location for customer relationships to be viewed and interacted with by a representative. Prior to communication with or when a communication is instigated with a customer, the representative will have access to the centralized data associated with the customer and the customer's accounts in arrears via an application associated with the unified recovery system.

The application presents customer information, prior communications, communication dispositions, current accounts, accounts in arrears, ranked importance of accounts in arrears to recover (such as primary, secondary, and relationship accounts), and the like. In this way, the representative may have information associated with all customer relationships within the entity easily accessible for his/her communication with the customer.

Furthermore, the unified recovery system may comprise a rules engine. In some embodiments, the rules associated with the rules engine may be manually input by a representative. In some embodiments, the rules associated with the rules engine may be automatically input. In some embodiments, the rules may be based on entity requirements or preferences. In some embodiments, the rules may be based on customer preferences. In yet other embodiments, the rules may be based on legal requirements or restrictions.

The rules may determine a primary account for recover associated with the customer, identify an appropriate representative for contacting a customer, warn or prohibit communications to a customer, or require disposition input after a communication. Determining a primary account in arrears to recover. Where the primary account is the account with payments in arrears that the system determines to be the one that must be recovered first. The primary account in arrears to recover includes selecting an account in arrears from a plurality of accounts associated with the customer that is most important for the entity to recover (i.e., which account of the plurality of accounts that the entity is most interested in collecting payments on first). Selecting an appropriate representative may be based on which representative has experience with that particular customer, knowledge with that particular primary account, or general expertise regarding a field associated with the primary account for recover. Warning or prohibiting communications to a customer may be based on internal restrictions, legal restrictions, or customer preferences. Finally, the rules may require the representative to provide disposition input with respect to a completed customer communication, such that the next representative to be in communication with the customer may have an indication as to the prior communications.

The system may also track the customer communications. In some embodiments, the system will track and record every call, both outbound and inbound. Tracking may occur both manually and automatically. The system may require the representative to manually input all data related to any attempted customer communication, such that the representative will not be allowed to move from the unified application for the customer he/she just attempted to call until the representative has completed all data regarding the call's results. This data may include the disposition of the communication, such as any outcome achieved, notes from the communication, payment schedules, when/where to next communicate to the customer, or the like.

In some embodiments, the system may also automatically track the customer communications and record information about the communication (or data about the communication). In this way, the system may automatically track information about the communication. As such, automatically tracked information about the communication may include if there was a busy response, if the customer answered, whom the representative spoke to, the duration of the communication, time of communication, date of communication, and the like.

The representative inputted disposition along with the communication history tracking enables the next representative to have access to all prior communications with a customer.

In some embodiments, the system may provide additional components or features to aid in the initiation, communications, and payment associated with a customer account in arrears. In some embodiments, the invention may aid in the initiation of recovery of a payment in arrears. In this way, the system may determine accounts in arrears, contact information for a customer, customer guarantor, other individuals associated with the accounts, primary account for recovers, priority accounts in arrears, or the like.

In some embodiments, the invention may aid in the communication between a representative and a customer. In this way, the components may aid the representative in determining when to communicate, how to communicate, whom to communicate with, or the like regarding accounts in arrears.

In some embodiments, the invention may aid in recovering payments associated with customer accounts in arrears. In this way, the components may aid the representative with the type of payment acceptable for the account in the arrears, how to accept a payment, or the like.

Embodiments of the invention relate to systems, methods, and computer program products for communication history tracking for recovering payments in arrears, the invention comprising: identifying products with payments in arrears and associating the products with payments in arrears with one or more responsible customers; identifying customer relationships across an entity for the one or more responsible customers and correlate customer relationship data with the one or more responsible customers; determining recovery priority of products with payments in arrears; creating a representative application unique to each of the one or more responsible customers, wherein the representative application comprises the identified customer relationship data, the identified products with payments in arrears, and customer contact information for each of the one or more responsible customers; authorizing an appropriate representative to communicate with one or more responsible parties, wherein the authorization is based at least in part on not triggering a rule that restriction communication with the one or more responsible customers; presenting, automatically, via an interface, the representative application to the representative for a responsible customer, wherein presenting the representative application to the representative is based at least in part on the authorizing of the representative to communicate with the responsible customer; identifying a customer communication and communication data associated with the customer communication, wherein communication data comprises identifying a date, time, and duration of the customer communication; storing the communication data in association with the representative application for the responsible customer; and updating rules for communicating with the appropriate customer based on the communication data, wherein the communication data limits the authorization of the appropriate representative to communicate with the responsible customer.

In some embodiments, the communication data associated with the customer communication further comprises determining that the communication resulted in one or more of no answer, busy signal, or contact with the responsible customer.

In some embodiments, the communication data associated with the customer communication further comprises determining an initiator of communication, wherein the initiator is the representative or the responsible customer.

In some embodiments, updating rules for communicating with the responsible customer further comprises identifying a number of communications with the responsible customer within a time period and preventing, based on the rules, future communications with the responsible customer based on the number of communications with the responsible customer within the time period.

In some embodiments, the rules include one or more of: entity established restrictions on communications with the one or more responsible customers based on customer location or prior communications; and legally established restrictions on communication with one or more responsible customers based on time, place, and manner of communication with the one or more responsible customers; and wherein, triggering the rules prevents the representative from communicating with one or more customers.

In some embodiments, the invention further comprising determining the appropriate representative to communicate with one or more responsible customers based at least in part on the appropriate representative's experience and expertise regarding the product with payments in arrears or the responsible customer.

In some embodiments, the determining priority of products with payments in arrears is based at least in part on account level variables and scoring metrics wherein account level variables include customer variables disclosed in the customer relationship and scoring metrics include rating the products with payments in arrears in importance of recovery.

In some embodiments, the representative application is an interface presented to the representative based on the representative's experience and expertise regarding the product with payments in arrears or based on an incoming communication from one or more responsible customers.

In some embodiments, the one or more responsible customers are customers that are a primary, secondary, or guarantor for the product with payments in arrears.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
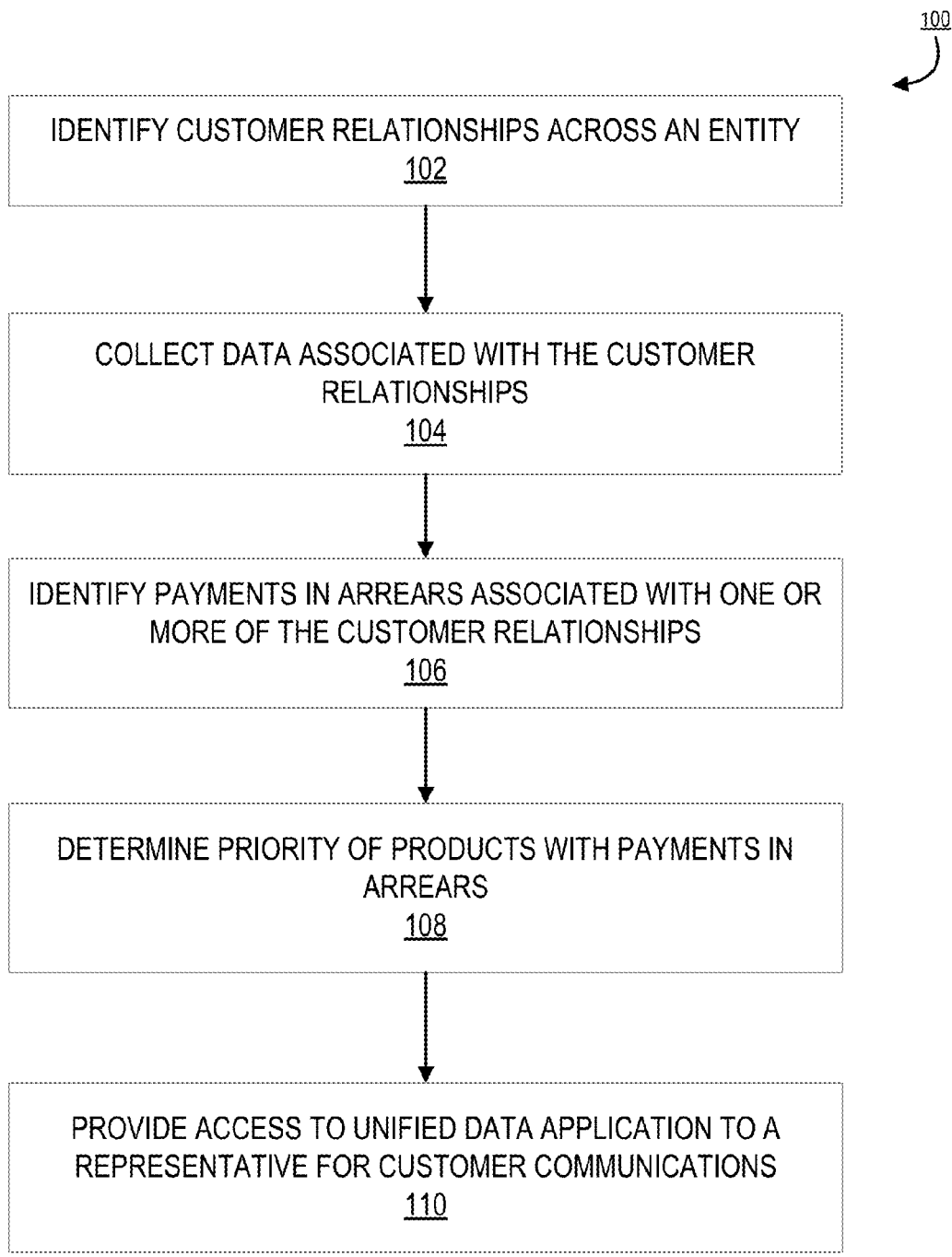
Figure 2:
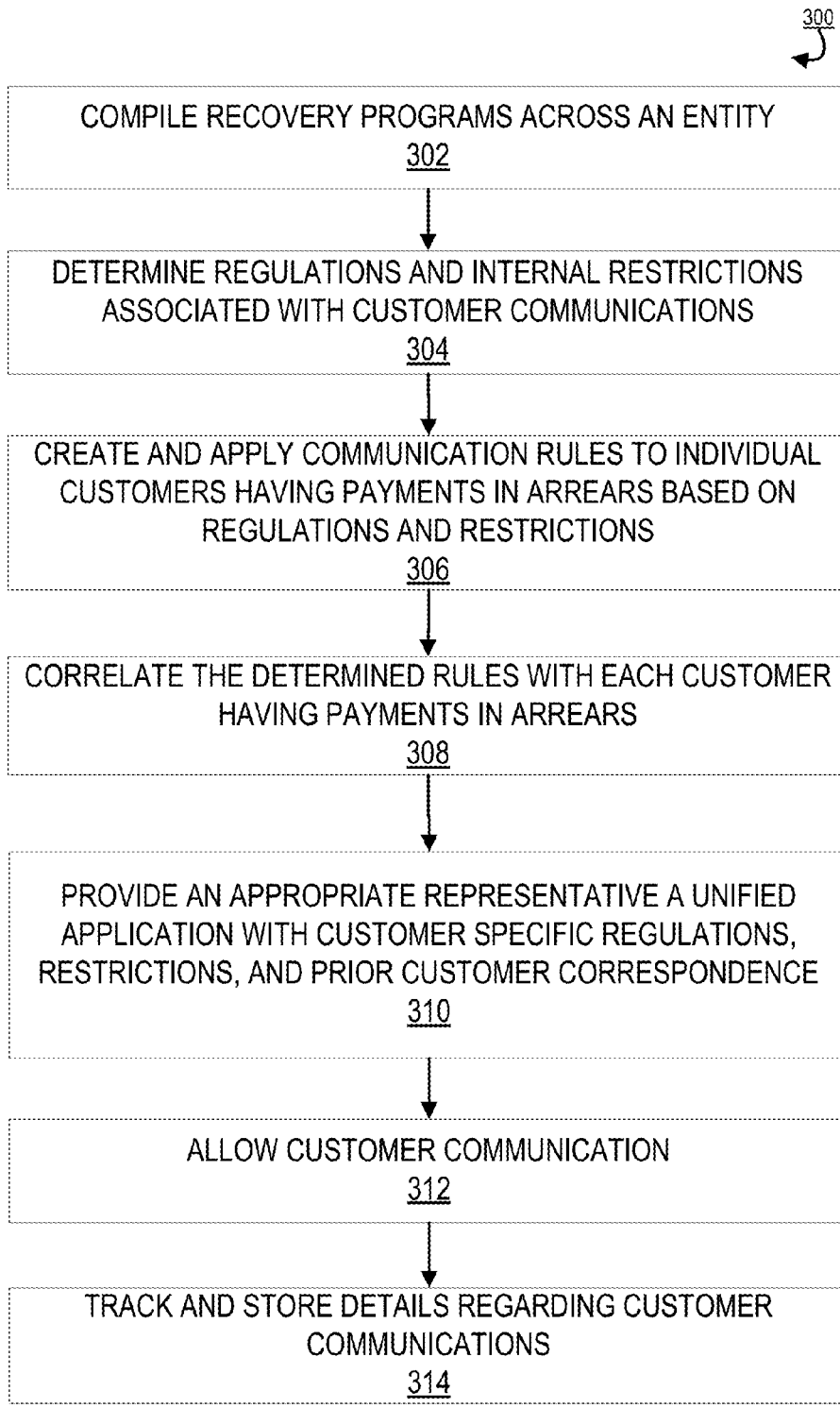
Figure 3:
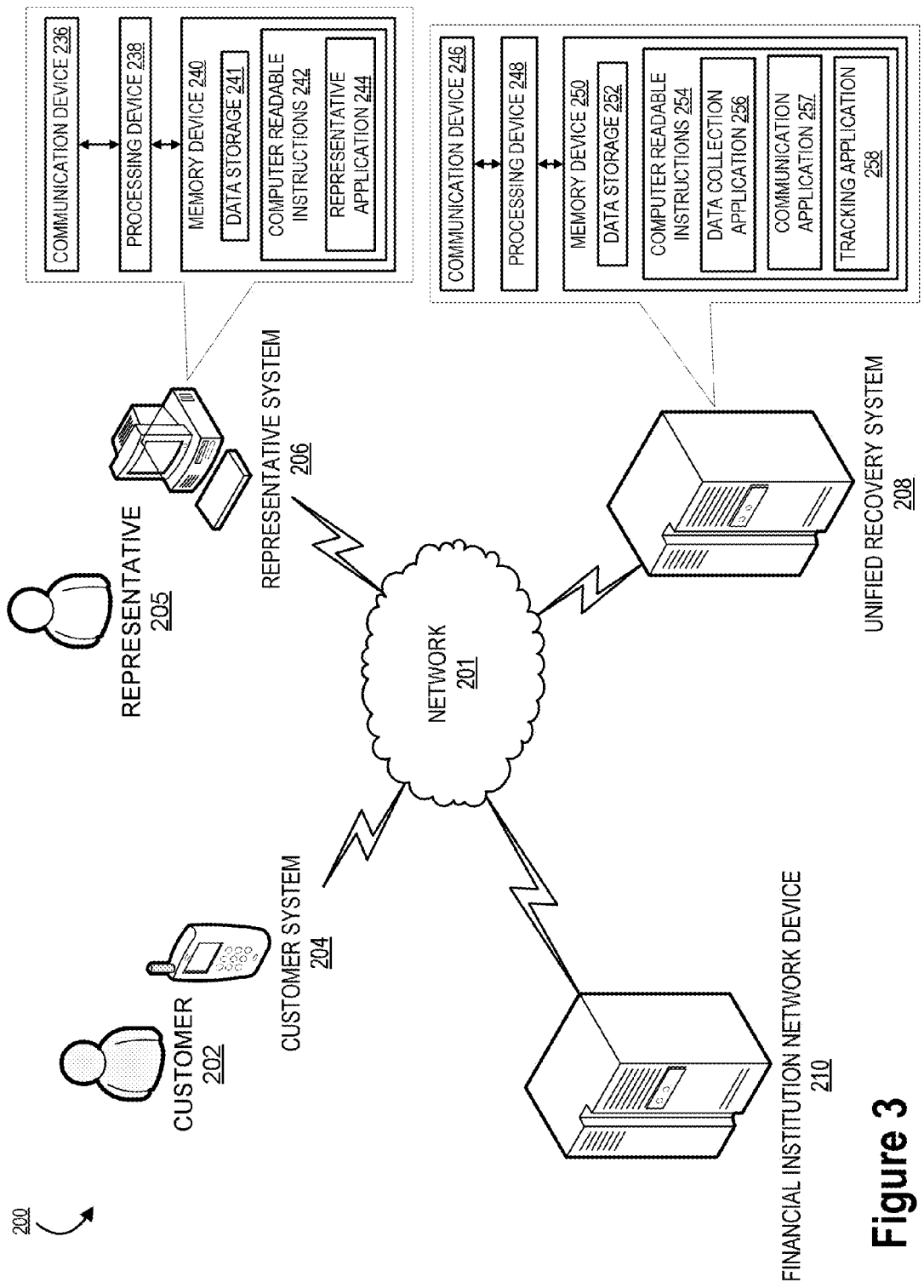
Figure 4:
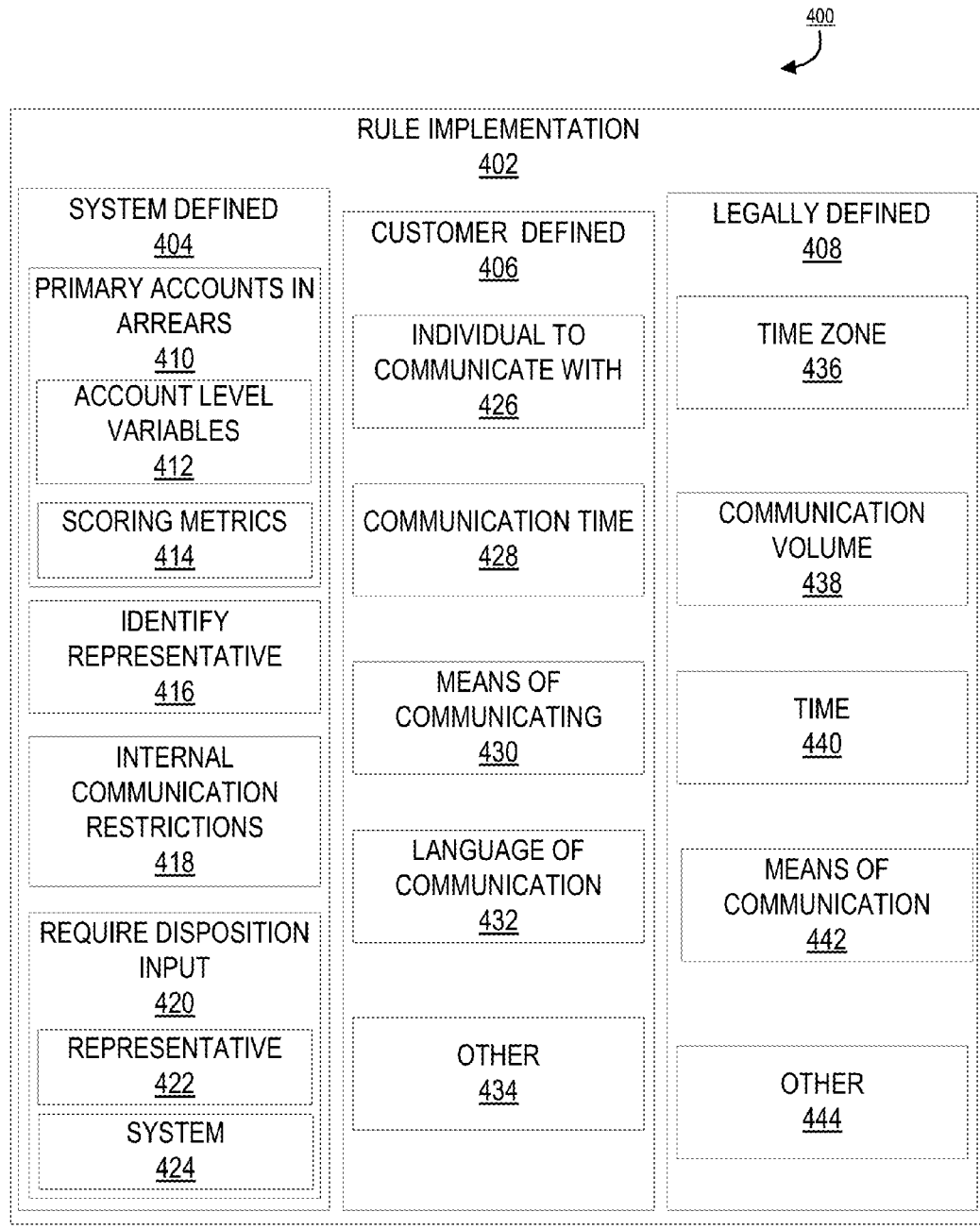
Figure 5:
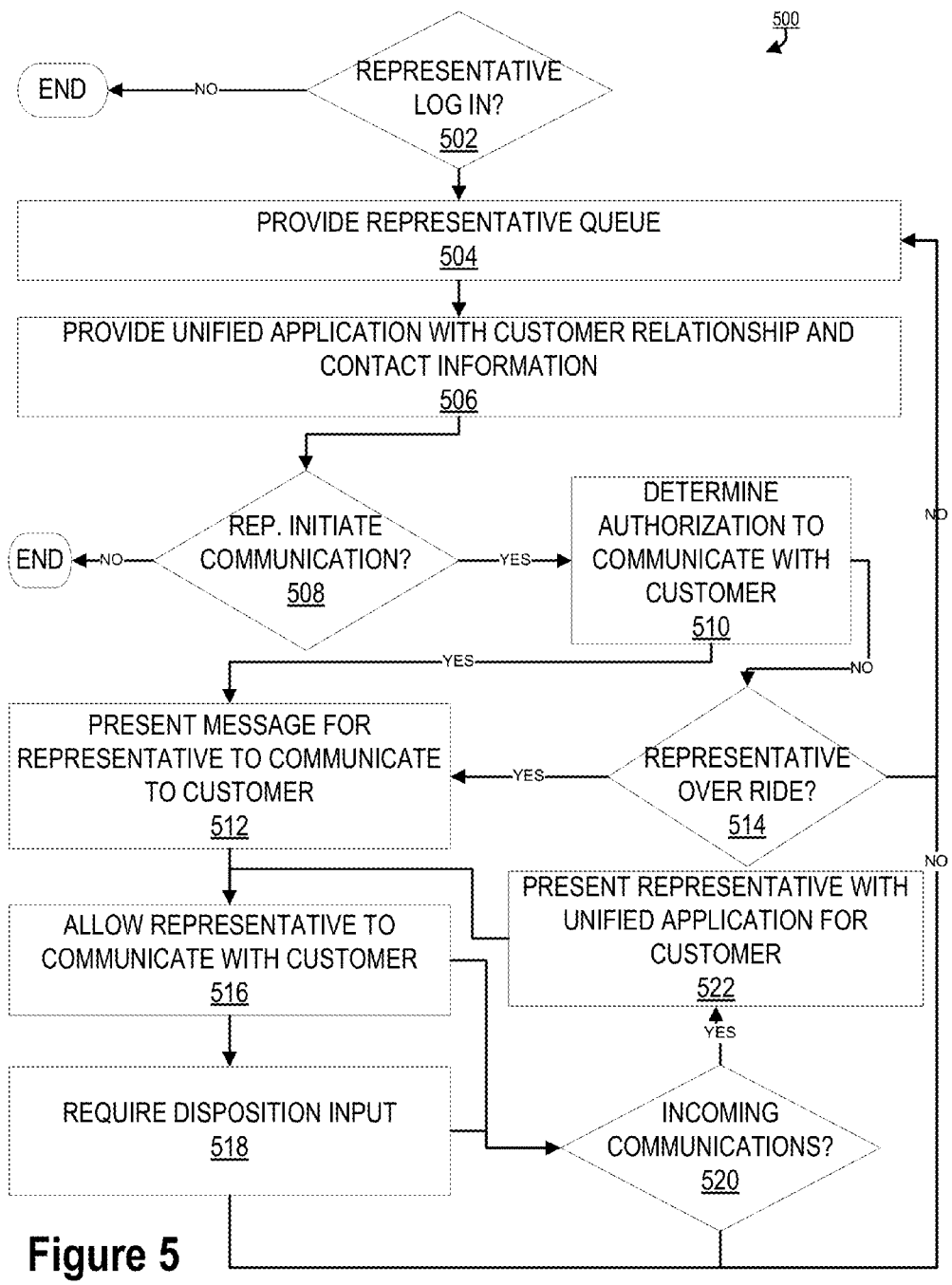
Figure 8:
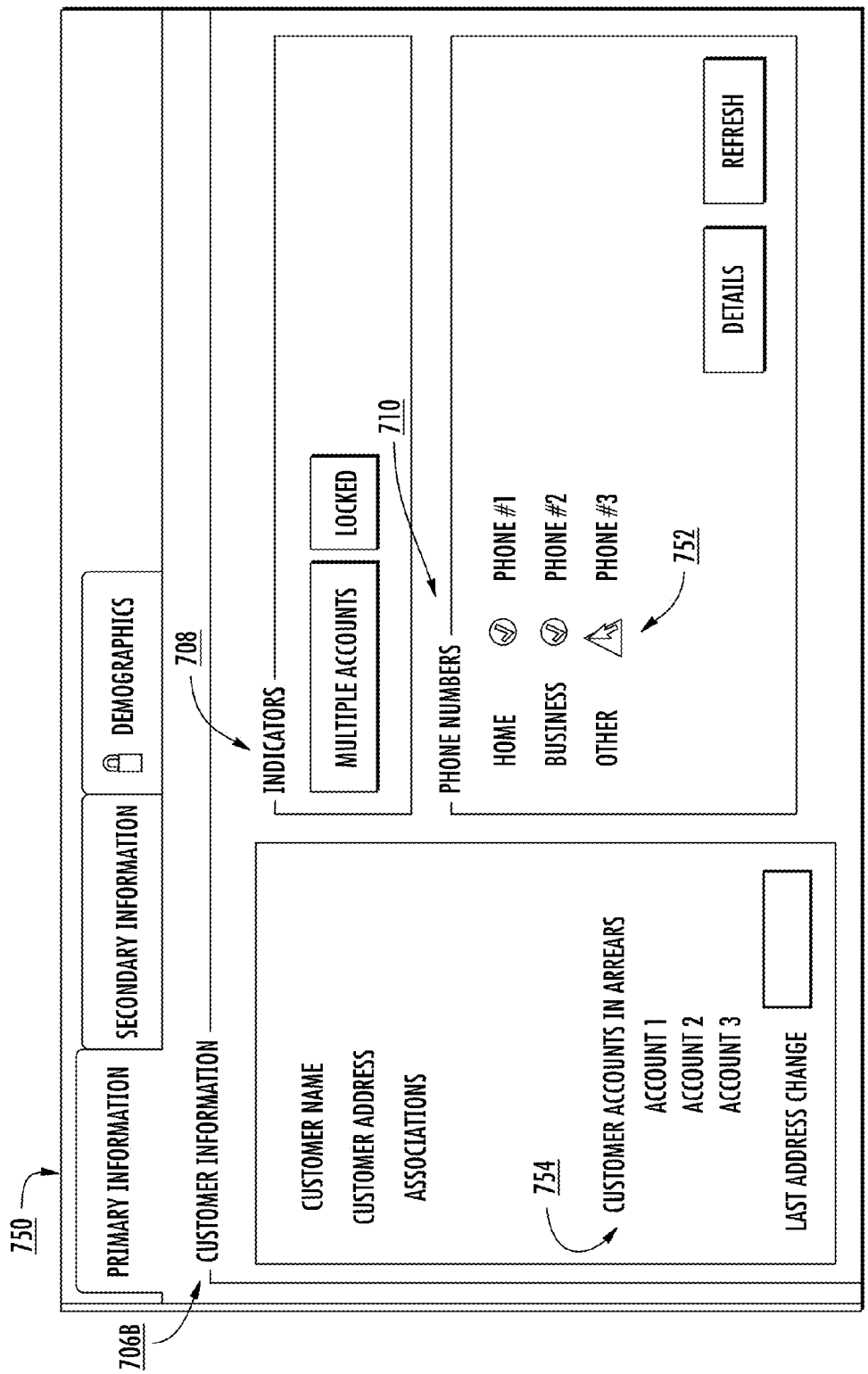
Figure 10A:
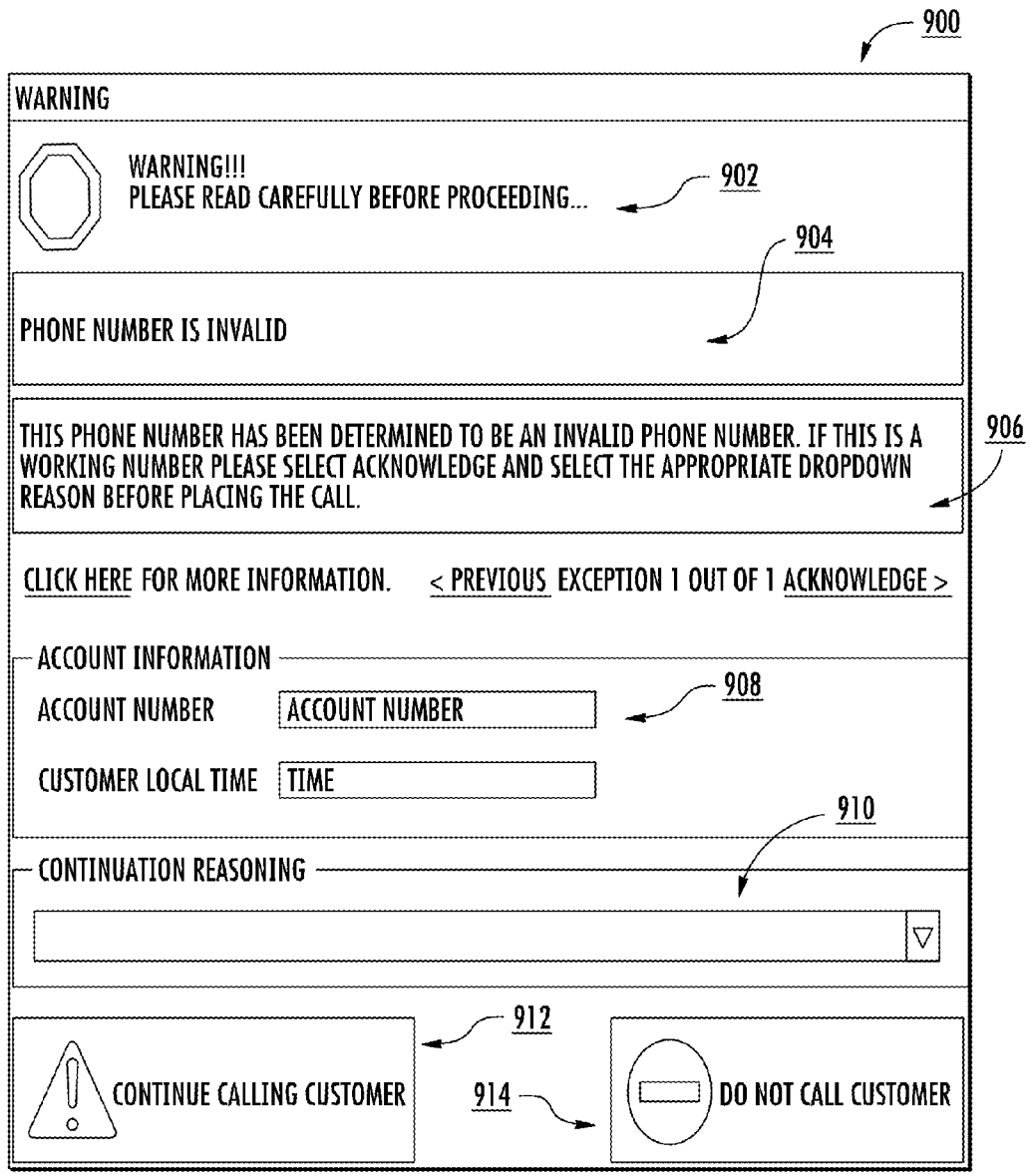
Figure 10B:
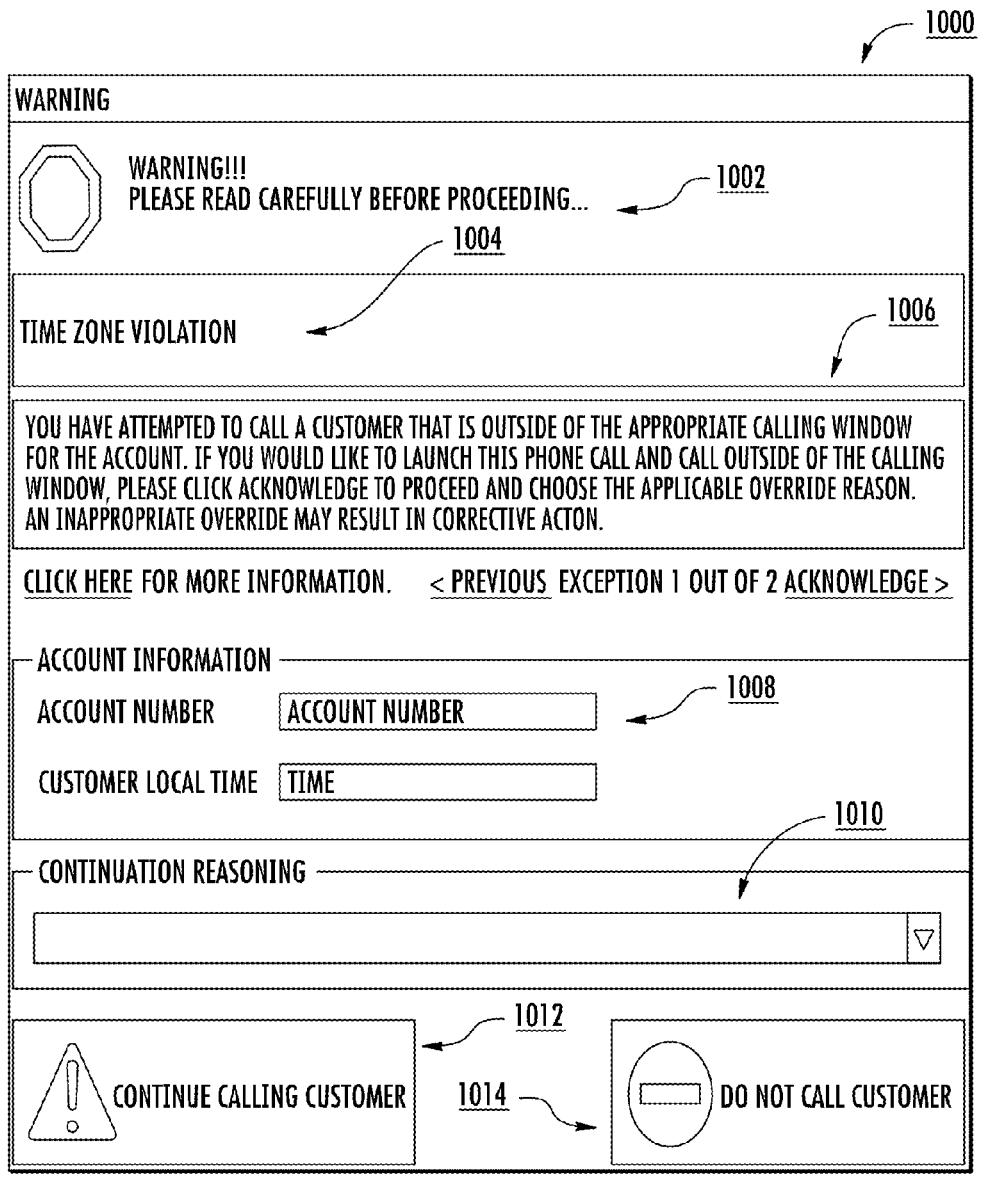
Figure 11:
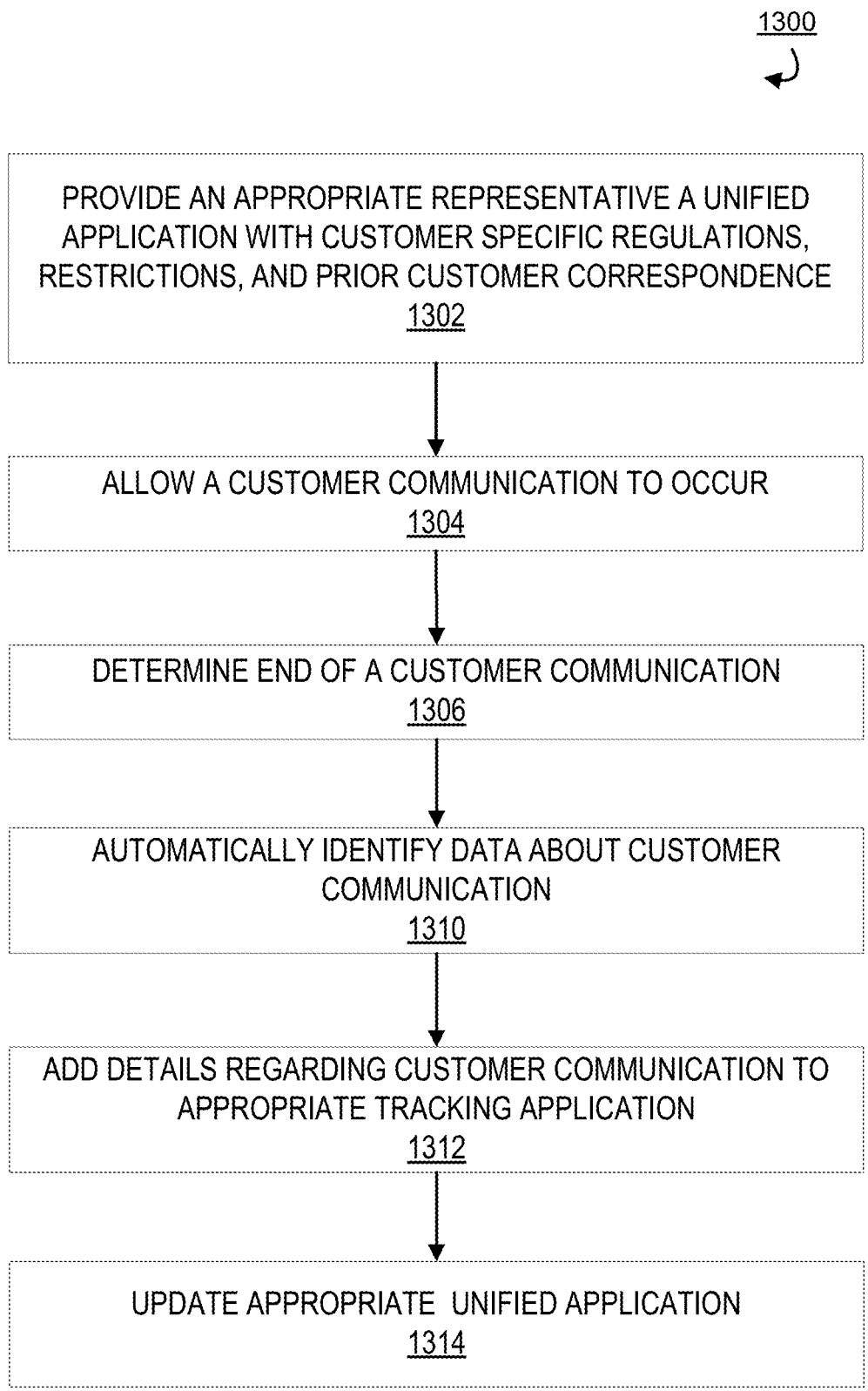
Figure 12:
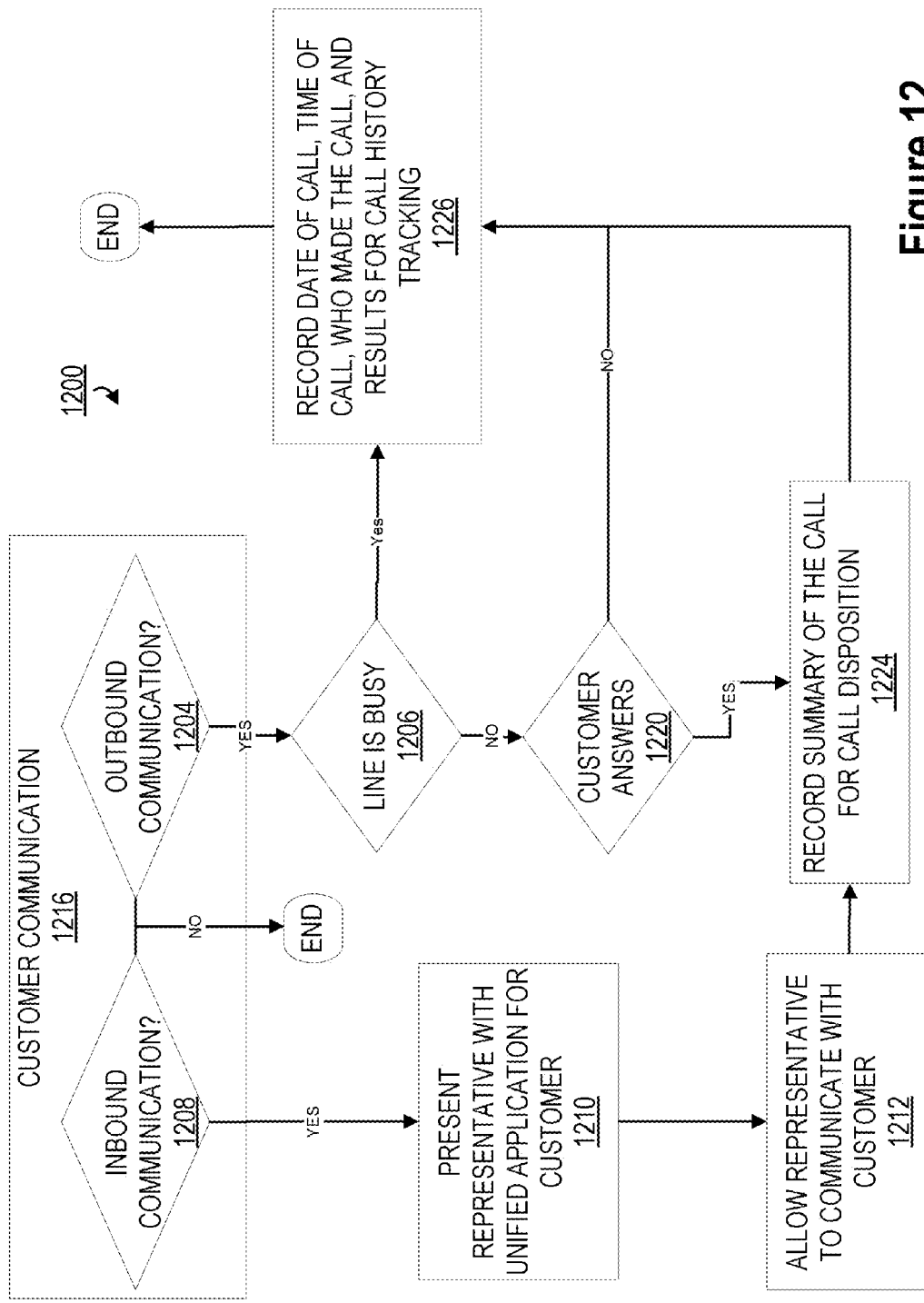

Having thus described embodiments of the invention in general terms, reference will now be made to the accompanying drawings, wherein:

FIG. 1 provides a high level process flow illustrating the unified recovery process, in accordance with one embodiment of the present invention;

FIG. 2 provides a high level process flow illustrating the unified recovery system process, in accordance with one embodiment of the present invention;

FIG. 3 provides a unified recovery system environment, in accordance with one embodiment of the present invention;

FIG. 4 provides a process map illustrating rules implementation for the unified recovery system, in accordance with one embodiment of the present invention;

FIG. 5 provides a process map illustrating a representative use of the unified recovery system, in accordance with one embodiment of the present invention;

FIG. 6 provides an interface illustrating a representative queue, in accordance with one embodiment of the present invention;

Figure 7:
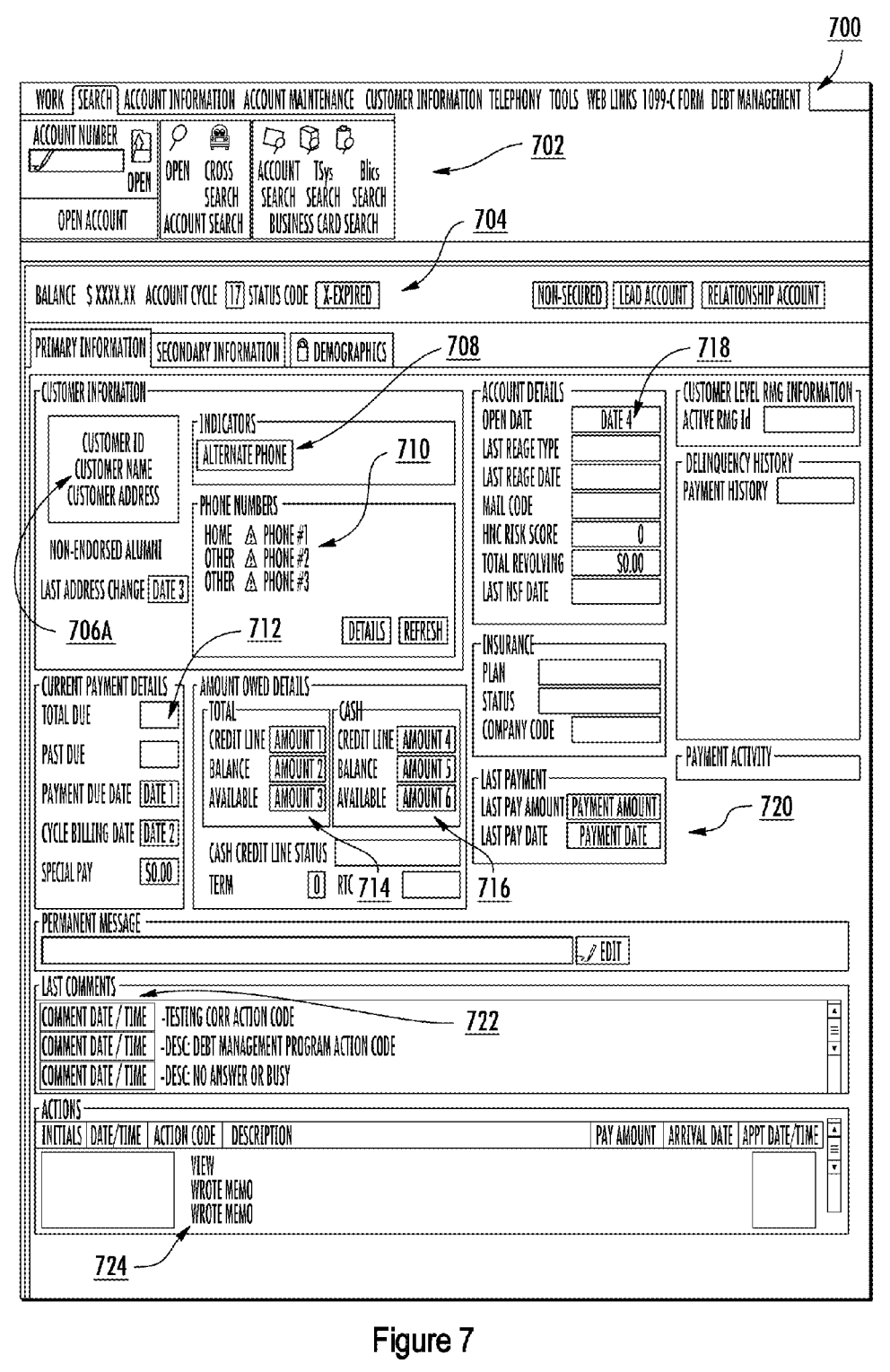

FIG. 7 provides an interface illustrating the unified application with customer relationships, in accordance with one embodiment of the present invention;

FIG. 8 provides an expanded view of the customer information section of the unified application with customer relationships, in accordance with one embodiment of the present invention;

FIG. 9 provides an example interface illustrating a message center prior to customer communications on the unified application, in accordance with one embodiment of the present invention;

FIG. 10A provides an interface illustrating a warning message presented to the representative, in accordance with one embodiment of the present invention; and FIG. 10B provides an interface illustrating a warning message presented to the representative, in accordance with one embodiment of the present invention;

FIG. 11 provides a high level process flow illustrating the communication history tracking of the unified recovery process, in accordance with one embodiment of the present invention; and FIG. 12 provides process map illustrating rules implementation for the communication history tracking, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, the term "product" or "account" as used herein may include any financial product, service, or the like that may be provided to a customer from an entity that subsequently requires payment. A product may include an account, credit, loans, purchases, agreements, or the like between an entity and a customer. The term "relationship" as used herein may refer to any products, communications, correspondences, information, or the like associated with a customer that may be obtained by an entity while working with a customer. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that utilized accounts in arrears recovery.

FIG. 1 illustrates a high level process flow for the unified recovery process 100, in accordance with one embodiment of the present invention, which will be discussed in further detail throughout this specification with respect to FIG. 2 through FIG. 12. As illustrated in block 102, the process 100 begins with identifying customer relationships across an entity. In this way, the system may identify all products that a customer may have with the entity across one or more lines of business within the entity. As such, addresses, affiliates, phone numbers, customer products, products with payments that are in arrears, and any other information that may be associated with a single customer may be gathered across the lines of business of an entity. Next, as illustrated in block 104, the data associated with the customer relationships may be collected and compiled in association with the customer. As such, all relationship data may be stored in association with a customer including those products and/or accounts that are in arrears.

The next step in the process 100, as illustrated in block 106, is to identify payments in arrears associated with the customer. As such, the products or accounts that have payments in arrears that are associated with that particular customer are identified. A product or account with a payment in arrears may be qualified as being in arrears based on the entity itself and/or agreements for payment between the customer and the entity. For example, after the due date for payment for the product or after a predetermined number of days after the due date, the product may be considered by the entity to be in arrears. Furthermore, the accounts or products with payments in arrears for people affiliated with that customer, such as when the customer is a guarantor for the associate or the like, may also be identified by the system. People affiliated with the customer may include friends, family, or the like associated with the customer.

As illustrated in block 108, the system determines the priority of the products with payments in arrears. In this way, the system may determine which products in arrears should take priority over the other products for purposes of recovery of payments. The primary account for recover is the account or product that the entity has identified as having payment in arrears that is the one which needs to be recovered first. This may be based on entity determination, interest rate, amount, importance, or the like. As such, the system may identify the products with payments in arrears that are the most important to recover first ahead of the other payment products. Thus, the representative may focus on recovering payments for that identified product. Finally, as illustrated in block 110, the process 100 continues by providing access to a unified application to a representative for customer communications. The unified application provides the representative with an across the entity view of the customer's relationship with the entity as well as information associated with the primary account and other accounts with payments in arrears. Finally, the unified application also provides information associated with prior customer communications. As such, the invention provides a holistic customer service experience for a customer with accounts in arrears.

FIG. 2 illustrates a high level process flow for the unified recovery system process 300, in accordance with one embodiment of the present invention. The process 300 describes a high level of the unified recovery system's steps to providing a representative with the unified application to aid in payment in arrears recovery. First, as illustrated in block 302, the system compiles the various recovery programs across the entity. In this way, all recovery programs may be centralized, such that the representative can log into a single system. This eliminates requiring the representative to log into a plurality of software programs in order to view and understand all relationships a customer has with the entity.

Next, as illustrated in block 304, the system may determine regulations and internal restrictions associated with individual customer communications. Regulations may include laws or other regulations regarding the time of day a customer may be contacted, the amount of times within a given day/week/month that a customer may be contacted, a telephone number in which a customer may be contacted, or the like. As such, the system ensures that the representative is following all regulations and/or laws regarding the contacting of customers with products having payments in arrears. Internal regulations may include any rule that an entity may put in place to restrict or warn a representative prior to the representative contacting a customer or during the representative's communication with the customer. For example, an internal regulation may be set based on a customer communication preference, such as a specific telephone number to utilize for communications with the customer. In another example, the entity may identify an event that requires the entity to delay in communicating with a customer regarding a product with a payment in arrears (e.g., a natural disaster in the geographic are where the customer is located or another known event that may interfere with a customer providing payment).

In some embodiments, the regulations or restrictions may, in some instances, be overridden by the representative. In this way, the representative may still contact the customer even if a regulation or restriction is in place. The representative may need to input a reason for overriding the regulation or restriction. In some embodiments, the regulation or restriction may not be overridden by any representative. In this way, the system will not allow the representative to communicate with the customer at that time. In some embodiments, no regulation or restriction may be placed on a customer communication. As such, the representative may contact the customer at any time.

Next, as illustrated in block 306 the system may utilize the regulations and restrictions to create rules for customer communications. These rules may be created and applied to a customer on a customer-by-customer basis. In this way, each customer, based on the customer's location, telephone number, or the like, may have a unique set of rules applied for him/her based on regulations and/or restrictions that may apply to the customer having payments in arrears for products. Next, once the rules have been created and applied in block 306, the determined rules may be correlated with each individual customer having payments in arrears, as illustrated in block 308.

As illustrated in block 310 of FIG. 2, the system may provide a unified application for displaying a customer relationship to an appropriate representative. The unified application has specific regulations, restrictions, and prior customer correspondence associated therewith. An appropriate representative may be identified by the system based on which representative has experience with that particular customer, knowledge with a particular account in arrears, or general expertise regarding a field associated with the primary account for recovery. The system may identify and match the customer with the appropriate representative based on these factors.

Next, as illustrated in block 312 the system may allow the representative to initiate a communication with the customer. Allowing the representative to initiate a communication with a customer may be based on the determined regulations and restrictions. In some embodiments, the regulations and restrictions will not allow a representative to communicate with the customer. In some embodiments, the regulations and restrictions will warn against communicating with the customer. However, a representative may be able to override the warning. In some embodiments, the regulations and restrictions will allow a representative to communicate with the customer.

Finally, as illustrated in block 314, the system may track and store details regarding the customer communications. In this way, the system may track the disposition of the communication, such as determining if a communication was answered by the customer, a busy signal was received, or that the customer answered the communication. The system may identify the date, time, means of communication (such as specific telephone number, email address, or the like). Furthermore, the system may store any comments or notes made by the representative during the communications.

FIG. 3 provides a unified recovery system environment 200, in accordance with one embodiment of the present invention. As illustrated in FIG. 3, the unified recovery system 208 is operatively coupled, via a network 201 to the customer system 204, to the representative system 206, and to the financial institution network device (or system) 210. In this configuration, the unified recovery system 208 may send information to and receive information from the customer system 204, the representative system 206, and financial institution network device (or system) 210, to correlate all of the customer's relationships with an entity into one unified recovery system. FIG. 2 illustrates only one example of an embodiment of a unified recovery system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the customer 202 is an individual who maintains products with the entity. These products may be one or more contracts, accounts, loans, transactions, agreements, or the like. As such, the customer 202 may have one or more products with payments in arrears. In some embodiments, the customer 202 may be a merchant or a person, employee, agent, independent contractor, and the like acting on behalf of the merchant that may have one or more products with payments in arrears with the entity.

As illustrated in FIG. 3, the unified recovery system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the representative system 206, the customer system 204, and the financial institution network device (or system) 210. As such, the communication device 246 generally comprises a modem, server, or other device for communicating with other devices on the network 201.

As further illustrated in FIG. 3, the unified recovery system 208 comprises computer-readable instructions 254 stored in the memory device 250, which in one embodiment includes the computer-readable instructions 254 of a data collection application 256. In some embodiments, the computer-readable instructions 254 include a communication application 257. In some embodiments, the computer-readable instructions 254 include a tracking application 258. In some embodiments, the memory device 250 includes data storage 252 for storing data related to unified recovery system including but not limited to data created and/or used by the data collection application 256, communication application 257, and/or tracking application 258.

In the embodiment illustrated in FIG. 3 and described throughout much of this specification, the data collection application 256 may be configured to collect and compile recovery programs utilized across the entity, customer relationship data across an entity, and to generate a centralized location for customer data.

In some embodiments, the data collection application 256 may collect and compile recovery products utilized across the entity into a single centralized unified recovery system 208. These may be collected from entity representative systems 206, the financial institution network device (or system) 210, and/or other systems. These recovery products may be internal or external dockets, ledgers, software, systems, or the like that are designed to initiate, monitor, and record any communication or payment associated with customer 202 product accounts in arrears.

In some embodiments, the data collection application 256 may collect and compile customer relationship data. In this way, the data collection application 256 may compile all information that an entity may have associated with a customer 202. Customer relationship data may include, but is not limited to addresses associated with a customer, customer contact information, customer affiliate information, customer products, customer products in arrears, or other information associated with the customer's one or more accounts, loans, products, purchases, agreements, or contracts that a customer may have with the entity. In some embodiments, the customer relationship associates primary, secondary, and relationship accounts and/or products with various customers to one customer. In this way, some accounts associated with a family member, friend, or that customer may all be associated with that customer. This way, the data collection application 256 compiles this data such that one individual customer may be contacted regarding one or more accounts/products in arrears. Customer affiliates may be one or more of co-signers, named on the account, family member, or the like associated with the account.

In other embodiments, the data collection application 256 may merge the recovery programs and the customer relationship data together into the unified recovery system 208. This data may be stored and grouped by the customer 202, customer identification number, account number, or telephone number. In this way, the system may generate a single centralized location for customer relationships for a representative to view and interact with. As such, any different recovery products and customer relationship data may be integrated into the one centralized unified recovery system.

In the embodiment illustrated in FIG. 3 the unified recovery system 208 further comprises a communication application 257. The communication application 257 allows for presentment of data to the representative, for rules determination and presentment, determines primary accounts for recovery, and for communication via a network 201 with the customer 202.

In some embodiments, the communication application 257 allows for presentment of data to the representative. This data may be customer 202 information, prior communications, communication dispositions, current accounts, accounts in arrears, primary accounts for recovery, and the like. In this way, the representative may have information associated with all customer relationships within the entity easily accessible for his/her communication with the customer 202.

In some embodiments, the communication application 257 allows for incorporation of a rules engine into the information provided to the representative. In some embodiments, the rules associated with the rules engine may be manually input by a representative. In some embodiments, the rules associated with the rules engine may be automatically input. In some embodiments, the rules may be based on entity requirements or preferences. In this way, the rules may be based on segments of the entity, such as lines of business, business units, or the like. In some embodiments, the rules may be based on customer preferences. In yet other embodiments, the rules may be based on legal requirements or restrictions. These rules may be communicated to the representative system 206 for the representative 205 from the communication application 257 via the network 201. In this way, the representative 205 may be aware of the rules for customer 202 communications.

Along with the rules, the communication application 257 may also determine a primary accounts for recovery associated with the customer 202, identify an appropriate representative 206, warn or prohibit communications to a customer 202, or require disposition input after a communication. Determining a primary account for recovery requires the communication application 257 to communicate with the financial institution network device (or system) 210 to select an account in arrears that is the primary account for the entity to focus recovery efforts. This may be determined by entity determined factors, such as interest rates, amounts due for recovery for one or more accounts in arrears, representative determined accounts, mortgage accounts, or the like. Selecting an appropriate representative may be achieved by the communication application 257 based on which representative has experience with that particular customer, knowledge with that particular primary account for recovery, or general expertise regarding a field associated with the primary account for recovery. The communication application 257 may communicate warning or prohibiting communications to a customer 202 via the network 201 to a representative system 206.

In some embodiments, the communication application 257 may allow for communications between a representative 205 of the entity and a customer 202 of the entity via the network 201. In preferred embodiments, the communication between the representative 205 and the customer 202 is typically done through telephone communications, such as telephone calls. Other representative 205 communication with the customer 202 may be via text messaging, email messaging, or other voice communications. In this way, the communication application 257 allows for the communication, limits the communication, and/or doesn't allow any communication based on the rules determined.

In the embodiment illustrated in FIG. 3 the unified recovery system 208 further comprises a tracking application 258. The tracking application 258 tracks the customer 202 communications. As such, dates, times, outcomes, responses, dispositions, or the like associated with each and every attempt to contact the customer 202 are tracked and recorded. In this way, the system may track whether a communication went through to the customer, whom the representative spoke to, the duration of the communication, time of communication, date of communication, or the like. As such, the most recent communication data is recorded on the tracking application 258 so that the tracking application continues to accurately track all customer 202 communications associated with each and every attempt to contact the customer 202.

Furthermore, after the representative 205 completes the communication with the customer 202, the representative 205 must update information associated with the customer 202 whom he/she just attempted to call with the data regarding the call's disposition. The disposition include all the call's results, such as any outcome achieved, notes from the communication, payment schedules, when/where to next communicate to the customer, or the like.

The tracking application 258 may communicate with other devices on the network 200 to update the any new internal restrictions, such as new customer preferences, and apply any external legal regulations. In this way, the unified recover system 208 can determine if and when another representative 205 can communicate with the customer 202. In addition, the representative 205 will be aware of any new rules for customer 202 communications. The system may be designed not to let the representative 205 proceed with future customer 202 communications.

As illustrated in FIG. 3, a representative 205 may be an individual customer service representative for an entity. In some embodiments the representative 205 may be an individual employed by the entity. In some embodiments, the representative 205 may be an outside contractor for the entity. The representative 205 may have unique skills or experience with recovery payments in arrears for various products associated with products provided by the entity.

As illustrated in FIG. 3, the representative system 206 generally comprises a communication device 236, a processing device 238, and a memory device 240. The processing device 238 is operatively coupled to the communication device 236 and the memory device 240. In some embodiments, the processing device 238 may send or receive data from the customer system 204, financial institution network device (or system) 210, and/or the unified recovery system 208 via the communication device 236 over a network 201. As such, the communication device 236 generally comprises a modem, server, or other device for communicating with other devices on the network 201.

As further illustrated in FIG. 3, the representative system 206 comprises computer-readable instructions 242 stored in the memory device 240, which in one embodiment includes the computer-readable instructions 242 of a representative application 244.

In the embodiment illustrated in FIG. 3, the representative application 244 allows the representative system 206 to be linked to the unified recovery system 208 to communicate, via a network 201, the information related to the communications with a customer 202 related to products with payments in arrears. The representative application 244 may also allow the representative to receive data, such as the unified representative application including customer relationships, or the like, in order to communicate with the customer.

In some embodiments, the communication from the representative 205, such as communication inputted on the unified application by the representative 205 may be communicated to the unified recovery system 208 via the communication device 236.

FIG. 3 also illustrates a customer system 204. The customer system 204 generally comprises systems with devices the same or similar to the devices described for the unified recovery system 208, and/or the representative system 206 (i.e., communication device, processing device, and memory device). Therefore, the customer system 204 may communicate with the unified recovery system 208, the representative system 206, and/or the financial institution network device (or system) 210 in the same or similar way as previously described with respect to each system. The customer system 204, in some embodiments, is comprised of systems and devices that allow the customer 202 to communicate with the representative 205 over a network 201. The customer system 204 may be, for example, a home phone, a desktop personal computer, a mobile system, such as a cellular phone, smart phone, personal data assistant (PDA), laptop, or the like. Although only a single customer system 204 is depicted in FIG. 3, the unified recovery system environment 200 may contain numerous customer systems 204.

The financial institution network device (or system) 210 is operatively coupled to the unified recovery system 208, the representative system 206, and/or the customer system 204 through the network 201. The financial institution network device (or system) 210 has systems with devices the same or similar to the devices described for the unified recovery system 208 and the representative system 206 (i.e., communication device, processing device, and memory device). Therefore, the financial institution network device (or system) 210 communicate with the unified recovery system 208, the representative system 206, and/or the customer system 204 in the same or similar way as previously described with respect to each system. The financial institution network device (or system) 210, in some embodiments, is comprised of systems and devices that allow the unified recovery system 208, the representative system 206, and the customer system 204 to access one or more accounts associated with the customer 202 of the financial institution.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 illustrates rules implementation for the unified recovery system 400, in accordance with one embodiment of the present invention. The rules for rule implementation 402 may be developed by different sources. As such, there may be rules that are system defined 404, customer defined 406, or legally defined 408.

System defined 404 rules for implementation include determining a primary account or product in arrears for recovery 410, identifying an appropriate representative 416, internal communication restrictions 418, and requiring the providing of disposition inputs 420. Each of these system defined 404 rules may be implemented by the entity, one or more lines of business of the entity, or the like. The system defined 404 rules may group the customer accounts with payments in arrears in segments, queues, campaigns, lists, or the like. In this way, the system defined rules 404 may group customer accounts with payments in arrears that are similar to each other, such that they may be grouped together and placed into a single representative's segment, queue, campaign, list, or the like.

Determining the primary account for recover requires the system to determine the priority of the products with payments in arrears that should be collected ahead of other products, such receiving payments on a home loan owned by the customer ahead of payments on a car loan and credit card also associated with customer. In this way, the system may determine which products in arrears require recovery first. This is referred to as the primary account for recovery. The primary account for recovery is the account or product that the entity has identified as having the highest priority for recovery of payments over the other accounts held by the customer. In specific embodiments, the primary account for recovery 410 is based on account level variables 412 and/or internal scoring metrics 414. The account level variables 412 include account information such as interest rate, amount in arrears, or the like. Internal scoring metrics 414 measure the various products provided by an entity to determine which are the most important to recover. These may include various types of loans, lines of credits, or the like. As such, the entity will internally determine the importance of recovering each of these products. As such, the system may identify the products with payments in arrears that is the product that all recovery efforts must be focused on initially, thus is the account or product identified to be recovered first, over all other accounts in arrears. This account is classified as the primary account in arrears for recovery 410.

In some embodiments, the system defined 404 rules include identifying an appropriate representative 416. Identifying an appropriate representative 416 based on rules requires determining which representative has experience with that particular customer, knowledge with that particular primary account for recovery, or general expertise regarding a field associated with the primary account for recovery.

In some embodiments, the system defined 404 rules include internal communication restrictions 418. These rules may place a restriction or warning on the attempted communication with a customer. The internal communication restrictions 418 may be provided by the system based on various factors associated with that customer or customer location. For example, the system may determine that there has been a natural disaster such as a hurricane, flood, tornado, earthquake or the like near the customer's location. As such, the system may restrict communications with that customer. Internal communication restrictions 418 may also be any other internally documented or noted reason for delaying or restricting the communications with a customer.

In some embodiments, the system defined 404 rules include rules requiring dispositions to be inputted 420. Dispositions may be narratives from the representative 422 or system 424 that detail the customer communications. Representative 422 disposition input may include information about the customer communication, such as if an agreement was reached on payment, updated information about the customer, or information about the discussion between the representative and the customer. System 424 disposition input may include system identified data regarding the customer communication. This may include the time of day for the communication, date of communication, whether the customer answered, whether a third party answered, whether the communication line was busy, whether there was no answer, or the like.

Customer defined 406 rules for implementation include which individual(s) to communicate with 426, an approved communication time 428, an approved means of communicating 430, a language of communication 432, or other 434. In some embodiments, the customer defined 406 rules include individuals to communicate with 426. In this way, a customer may identify a guarantor or individual within the household that may be responsible for the product in arrears. As such, the customer may note which individual to have communications with to discuss payments for the product in arrears.

In some embodiments, customer defined 406 rules include best communication times 428. In this way, the customer may state that the best time to reach or communicate with him/her is a specific time. For example, a customer may request the representative communication at 8:00 pm to discuss the product with payments in arrears. As such, the communication time customer defined 406 rule may be to communicate with the customer at the time the customer has specified.

In some embodiments, the customer defined 406 rules may include restrictions on the means of communication 430. The means of communication 430 may include telephone communications, other voice communications, email communication, text communications, or the like. The customer may recommend that he/she be communicated with strictly by one or more of the communication means. This request will be implemented as a rule for the representative to be made aware of prior to customer communications.

In some embodiments, the customer defined 406 rules may include a language of communication 432. In this way, various languages such as Spanish, French, German, or the like may be spoken with that particular customer. Finally, customer defined 406 rules may change based on the customer. As such, other rules may be added or removed based on customer preference. Thus, providing the customer with a more pleasant communication regarding products with payments in arrears.

Legally-defined 408 rules for implementation include rules based on any laws or regulations that are directed towards a representative communication with a customer regarding payments in arrears for products. These legally defined 408 regulations or restrictions may include laws or other regulations regarding the time zone 436 of the customer. The time zone 436 associated with the customer may be identified based on the area code of the customer's telephone number. In some embodiments, there may be more than one time zone associated with the customer. Each time zone 436 rule will be stored individually per telephone number or communications means. There may be legal restrictions associated with when a customer may be contacted based on the time of day because of a difference in time zones between the customer and the representative.

In some embodiments, the legally defined 408 rules may restrict the communication volume 438, otherwise referred to as communication velocity. The communication volume 438 may be the amount of times the representative may contact the customer within a predetermined time period, such as number of times in a day/week/month. Furthermore the communication volume 438 may include the duration of time that the representative may spend in communication with a customer within a predetermined time period, such a limited amount of time in a 24 hour period.

In some embodiments, the legally defined 408 rules may restrict the time 440 of day the customer may be contacted. For example, a customer may only be contacted between 9:00 am and 6:00 pm during the week and not at all during the weekend. As such, the time 440 restrictions will utilize the time zone of the area code and determine if it is acceptable to communicate with the customer at that time. The system may be configured to forbid calling the customer outside of the acceptable time period.

In some embodiments, the legally-defined 408 rules may include restrictions on the means of communication 442. The means of communication 442 may include telephone communications, other voice communications, email communication, text communications, or the like.

In some embodiments, the rules may, in some instances, be over rode by the representative. In this way, the representative may still contact the customer even if a rule restricting the communication may be in place. The representative may need to input a reason for overriding the rule. In some embodiments, the rule may be permanent or unchangeable, thus a representative may not ever be capable of override the rule. In this way, the system will not allow the representative to communicate with the customer at that time. In some embodiments, no rule may be placed on a customer communication. As such, the representative may contact the customer at any time.

FIG. 5 illustrates a process map for a representative use of the unified recovery system 500, in accordance with one embodiment of the present invention. As illustrated in decision block 502 the process 500 is initiated when a representative logs on to the system. If the representative does not log on to the system, the process 500 is terminated. If the representative successfully logs on to system. Next, the system provides the representative queue to the representative, as illustrated in block 504. The representative queue provides a list of one or more customer's that the representative may communicate with in a day. The queue may be tailored to the representative, such that the queue is unique based on the representative's experience or the like. The queue provided in block 504 is illustrated in further detail below in FIG. 6.

FIG. 6 provides an interface illustrating a representative queue 600, in accordance with one embodiment of the present invention. As illustrated in section 602 the customers within the representative's queue are listed. Specifically, the customer's name and status type associated with the product with payments in arrears. In this example, the customers are primary, secondary, and a guarantor of the products with payments in arrears. Next, as illustrated in section 604 the primary contact phone numbers and other contact information is displayed. As such, the customer in the customer section 602 may be different than the primary contact's information in section 604. Along with the primary contact's telephone number and contact information, the source of the product with payments in arrears is displayed as well as the account number associated therewith. As illustrated in block 606 customer circumstance, including rules or comments regarding prior communications may be displayed for quick reference prior to the representative selecting the customer and entering the interface associated with the customer unified application. The representative may add or subtract further comments in the customer circumstance section 606 by selecting the ok or cancel buttons 610. Finally, as illustrated in section 608, the relationship accounts are listed. The relationship accounts correspond to the customer's within that representative's queue. This section identifies whether the account associated with the customer is a primary account, the balance due, last payment, payment schedule, and other information about the customer. In some embodiments, the customer may not be the primary contact for the account, as such this section 608 may provide the relationship the customer is to the primary contact.

Referring back to FIG. 5, as illustrated in block 506 once the representative selects a customer to communicate with from the queue the representative is provided the unified application with the customer relationship and contact information associated therewith. In some embodiments, the unified application may be presented when a representative selects a customer to contact. In other embodiments, the unified application may be presented when the representative receives an incoming communication from the customer. In yet other embodiments, the system may trigger automatic presentment of the unified application to the representative at specified time intervals.

FIG. 7 illustrates an interface for the unified application with customer relationships 700, in accordance with one embodiment of the present invention. The unified application 700 presents the representative with all necessary customer relationship data, information about the products with accounts in arrears, and prior communication history in one application. The unified application 700 may display all of the customer relationships, programs, rules, and the like detailed above with respect to FIGS. 1-4. In this way, a representative may be able to provide the best possible customer service to a customer, even if this is the first time the representative has communicated with that particular customer.

As illustrated in section 702, the unified application 700 provides the representative with a general toolbar with various capabilities to search within a database, queue, or the like. The searches may be performed based on an account or product number, based on whether the unified application is open with another representative, by cross searching, or the like. As illustrated in section 704 a customer specific toolbar allows a representative to quickly determine the balance remaining on the product, the number of account cycles the product has already been through, and a status of the account. Also the representative may be provided an indication that the account is in arrears, if attempts to recover the account have been implemented, whether the account is a primary account, secondary account, or relationship account. A primary account is the account that is the account that recovery is the primary focus of first recovery. The secondary accounts are one or more accounts or products that the customer may have that also have payments in arrears, but is not the primary payment account for recovery. Relationship accounts are accounts where the customer is a guarantor or the like.

While the toolbars are provided to a representative to allow the representative to quickly discern information, more detail is provided about the customer relationship or account with payment in arrears in the subsequent sections. As illustrated in the customer information section 706A, the customer identification number, customer name, and customer address is presented to the representative. Furthermore, information, such as the last time an address was changed is also within the customer information section 706A. Below the customer information section 706A is the current payment detail section 712 where there is information presented about current payments, past payments, billing cycles, and when payments are due.

As illustrated in section 708, the system provides the representative with indicators, such as if the unified application is locked by another representative, or the like. In this example, the indicator 708 presented indicates to the representative that the alternative phone number should be used in this case. As such, the customer may have provided a customer defined rule to make all communications to an alternative telephone number. Other indicators may include blocks on accounts based on non-secured accounts, lead or primary accounts, and relationship accounts As illustrated in section 710 the communication means are presented. In this case the communication means are telephone numbers. This section allows a representative to select a telephone number to communicate with the representative. This section, along with section 708, is further detailed in FIG. 8.

Referring back to FIG. 7, the unified application 700 further provides the representative with details about amounts owed, both in total 714 and cash 716. At section 718, there are more specific details regarding the account or product with payments in arrears. As such, account details such as the open date, or the like may be presented to the representative. Furthermore, the last payment associated with that product or account may be posted in section 720. Comments from previous communications with the customer may be presented in section 722. Finally, the representative may also input actions in the action section 724. The action section 724 may also indicate other actions from other representatives associated with the customer or account. In this way, the representative will have an overview of prior comments 722 and actions 724 when a customer is speaking about prior interactions with other representatives, the representative will be knowledgeable about the communications.

Referring back to FIG. 5, once the system has provided the representative with the unified application, the representative may, in decision block 508 decide to initiate communication with the customer. If the representative does not decide to initiate communication, the process 500 is terminated. If the representative does decide to initiate communication, the communication may be initiated via the system or via an outside communication device (e.g., a desktop telephone, another computing device, or the like). Next, as illustrated in block 510, if the representative does initiate a communication in decision block 508, the system may determine if the representative is authorized to communicate with the customer 510. FIG. 8 illustrates the various indicators with respect to whether the representative may communicate with the customer at this time.

FIG. 8 illustrates an expanded view of the customer information section of the unified application 750, in accordance with one embodiment of the present invention. As described above with respect to FIG. 7, the customer information 706B provides the customer name, customer address, and in this embodiment, provides customer affiliates. Affiliates may be friends, relatives, guarantors, or the like. Furthermore, customer accounts in arrears 754 are illustrated. In this case there are three accounts in arrears listed in order of importance, from primary account down. Section 708 provides the indicators, indicating multiple accounts in arrears for this customer and that another representative has a lock on this customer unified application. In this way, a customer may have more than one account in arrears in which that customer is associated with or responsible for. A lock on the customer unified application may be because another representative is viewing the customer information, is in communication with the customer, or the like. As illustrated in section 710 the communication means for the customer are located. Here the customer has three different phone numbers that he/she may be reached. Furthermore, the communication means section 710 further comprises indicators 752 regarding the authorization of the representative to contact the customer using that contact means. These indicators 752 take into account all rules, regulations, or restrictions described above in FIG. 4. If the representative is completely restricted from contacting the customer an indicator will be provided and the representative will not be able to contact the customer. If there is a restriction but the representative may override the restriction, a warning indicator will be provided. If there are no restrictions on the communication a different indicator will be provided. For example, in the example illustrated in FIG. 8, two of the telephone numbers (Home and Business) both have a check mark indicator, indicating that the representative is free to communicate with the customer using either of the two telephone numbers. However, the other telephone number has a warning indicator, indicating that the representative may override the warning, but should have a reason to contact the customer using the other telephone number. There may be several reasons for a warning or no communications indication. If the telephone number that is selected has one of these warnings, the system will prompt the representative to a warning message, such as represented in FIGS. 10A-10B.

Referring back to FIG. 5, if the representative is not authorized to communicate with the customer in block 510 based on an indicator, the representative may decide to override the authorization if possible, as illustrated in decision block 514. If the indicator is not able to be overrode the process 500 sends the representative back to his/her queue, in block 504. FIGS. 10A and 10B illustrate a warning message presented to the representative 900, 1000, in accordance with one embodiment of the present invention. This warning message would be presented to the representative if he/she is attempting to communicate with a customer that the representative is not authorized to communicate with. The warnings provide a message to the representative regarding moving forward with the communication 902, 1002, as well as why there is a limitation on the communication with the customer. As illustrated in FIG. 10A the limitation in this case is that the telephone number is no longer valid, as illustrated in section 906. As such, the representative is not allowed to override the warning and is directed back to his/her queue. The warning also provided account information in section 908 as well as a box for the representative to input why he/she is overriding the warning in section 910. A typical override may be, for example, that the customer requested the representative call at that time/telephone number. A continuing calling customer button 912 may be highlighted if the representative is able to override the warning. If not, the representative must select the "do not call customer" button 914.

FIG. 10B provides an interface illustrating a warning message presented to the representative 1000, in accordance with one embodiment of the present invention. In this warning, the rule that is not satisfied is a legally defined rule associated with a time zone violation, as illustrated in section 1004. In section 1006 a description of the rule is presented to the representative. As illustrated in section 1008, the account information regarding the customer account associated with the customer that the representative is attempting to communicate is presented. Again, if allowed to override, the representative may input the reason for the override in section 1010. Finally, a "continuing calling customer" button 1012 may be highlighted if the representative is able to override the warning. If not, the representative must select the "do not call customer" button 1014.

Referring again back to FIG. 5, if the representative is authorized to communicate with the customer in block 510 or the representative overrode the warning not to communicate with the customer in decision block 514, the representative may be presented with a message to communicate to the customer, as illustrated in block 512. FIG. 9 provides an example interface illustrating a message sent prior to customer communications on the unified application 800, in accordance with one embodiment of the present invention. As illustrated in section 804, general information about the customer who is being contacted is presented. At section 802 the message is presented. This message is either to be read word-for-word to the customer or generally stated to the customer. The system then requires the representative to select that he/she read the message to the customer and select the "acknowledge" button prior to continuing with the conversation.

Referring again back to FIG. 5, once the representative has read the message presented to him/her to communicate to the customer, as illustrated in block 512, the system may allow the representative to communicate with the customer about his/her products with payments in arrears, as illustrated in block 516. Next, once the communication is complete, the system may require a disposition to be inputted, as illustrated in block 518. In some embodiments, the representative must input a disposition including comments regarding the customer communication, payment, payment schedules, or the like discussed during the communication. In some embodiments, the system may input disposition data including whether the customer answered the communication, whether there was a busy signal when the representative contacted the customer, the time of the contact, the duration of the communication, and/or the date of the communication. In some embodiments, the disposition may be a payment or payment schedule from the customer to satisfy the account in arrears. In this way, a payment may be documented for the account in arrears and as such the amount of recovery may be less and/or nothing after the disposition has been made.

In certain embodiment, during the process 500, especially after the representative communication with the customer in block 516 or during the input of a disposition in block 518, the system may send the representative an incoming communication from a customer, as illustrated in decision block 520. If there is an incoming communication from a customer queued for the representative, he/she will be presented with the unified application for the customer associated with the incoming communication, as illustrated in block 522. At that point the representative may then be allowed to communicate with the customer, as illustrated in block 516. Finally, if there is no incoming communications in decision block 520, the process reverts back to providing the representative with the representative's queue, as illustrated in block 504.

FIG. 11 illustrates a high level process flow for the communication history tracking process 1300, in accordance with one embodiment of the present invention. The process 1300 describes a high level of the unified recovery system's steps to track each customer's communication history.

First, as illustrated in block 1302, the system provides an appropriate representative a unified application with customer specific regulations, restrictions, and prior customer correspondence. As aforementioned, the unified application includes specific regulations, restrictions, and prior customer correspondence associated therewith. The system may identify and match the customer with the appropriate representative.

Next, as illustrated by block 1304, the system will allow the representative to initiate the communication with a customer. Allowing the representative to initiate a communication with a customer may be based on the determined regulations and restrictions. In some embodiments, the regulations and restrictions will not allow a representative to communicate with the customer. In some embodiments, the regulations and restrictions will warn against communicating with the customer. However, a representative may be able to override the warning. In some embodiments, the regulations and restrictions will allow a representative to communicate with the customer.

As illustrated in block 1306, the system will identify the end of a customer communication, and prevent the representative from exiting the customer's unified application until the representative inputs the results and disposition of that communication. Furthermore, the system may store any disposition, such as comments or notes made by the representative during the communication. Once the representative has inputted his/her notes, the representative may be able to exit the unified application for the customer.

As illustrated in block 1310, the system will automatically track and record communication data associated with the customer communication. This data may include, data such as if the customer answered or did not answer the communication, as well as if a busy signal was received, the date of the communication, time of the communication, duration of the communication, or the like associated with the communication. The system may identify and record who initiated the communication, the date, the time, and the means of communication (such as specific telephone number, email address, or the like).

Next, as illustrated in block 1312, the system would add the disposition and customer communication data to the system, so that the system has the appropriate data regarding all of the customer's communications, including dates, times, outcomes, responses, or the like associated with each and every attempt to contact the customer. In some embodiments, the system may create a time log with a column for each of the required data types such as who initiated the communication, the date of the communication, the time of the communication, the duration of the communication, the outcome, and the like. At the end of a communication with customer, a new row of data associated with that specific communication would be added by the system.

Next, as illustrated in block 1314, the system would update the customer's appropriate unified application with any new information from the call disposition. As explained earlier, the system may utilize the regulations and restrictions to create rules for customer communications and these regulations might need to be updated after communication with the customer. For example, during the call the customer might indicate a new customer communication preference, such as a new specific telephone number to utilize for communications with the customer; this new internal restriction would be added to the unified application to ensure that the next representative to contact this customer is at least warned of the customer's request prior to the representative contacting the customer. In addition, laws or other regulations may limit the amount of times within a given day/week/month that a customer may be contacted. Consequently, the unified application must be updated accordingly to ensure that the representative is following all regulations and/or laws regarding the contacting of customers with products having payments in arrears.

FIG. 12 illustrates a process map for a representative use of the communication tracking history process 1200, in accordance with one embodiment of the present invention. As illustrated in decision blocks 1208 and 1204, the process 1200 begins when communication with a customer is initiated. Customer communication 1216 can be initiated by either outbound communication 1204, which may represent the representative calling a particular customer, or inbound communication 1208, which may represent a customer's incoming call. If no customer communication occurs in block 1216, the process 1200 is terminated.

If there is an incoming communication from a customer queued for the representative, the representative will be presented with the unified application for the customer associated with the incoming communication, as illustrated in block 1210. At that point, the representative may then be allowed to communicate with the customer, as illustrated by block 1212. At the end of the communication with the customer, the representative must record the disposition of the call, including comments regarding the customer communication, payment, payment schedules, or the like discussed during the communication, as illustrated by block 1224.

As illustrated in block 1226, the system may additionally determine customer communication data pertaining to who initiated the communication, the date of the communication, time of the communication, the duration of the communication, whether there was a busy signal, whether there was no answer, and the like.

If the representative is contacting a customer, as illustrated in decision block 1204, the representative may already have been presented with the unified application for the customer and the system has allowed the representative to communicate with the customer. Continuing from the outbound communication decision block 1204, the next step in the process is represented by decision block 1206, determining of the customer is busy. In this particular embodiment, if the line is not busy, and the customer answers, as illustrated in decision block 1220, then the representative must record the disposition of the call, as illustrated in block 1224. After recording the disposition of the call, the system may record further details of the communication, as represented by block 1226. If the line is busy, or a customer does not answer, the representative and/or the system still must record the details of the attempted communication as represented by block 1226.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for communication history tracking for recovering payments in arrears, the system comprising:
   a memory device with computer-readable program code stored thereon;
   a communication device;
   a processing device operatively coupled to the memory device and the communication device, wherein the processing device is configured to execute the computer-readable program code to:
      identify products with payments in arrears and associating the products with payments in arrears with one or more responsible customers;
      identify customer relationships across an entity for the one or more responsible customers and correlate customer relationship data with the one or more responsible customers;
      determine recovery priority of products with payments in arrears;
      create a representative application unique to each of the one or more responsible customers, wherein the representative application comprises the identified customer relationship data, the identified products with payments in arrears, and customer contact information for each of the one or more responsible customers;
      authorize an appropriate representative to communicate with one or more responsible parties, wherein the authorization is based at least in part on not triggering a rule that restriction communication with the one or more responsible customers;
      present, automatically, via an interface, the representative application to the representative for a responsible customer, wherein presenting the representative application to the representative is based at least in part on the authorizing of the representative to communicate with the responsible customer;
      identify a customer communication and communication data associated with the customer communication, wherein communication data comprises identifying a date, time, and duration of the customer communication;
      store the communication data in association with the representative application for the responsible customer; and
      update rules for communicating with the appropriate customer based on the communication data, wherein the communication data limits the authorization of the appropriate representative to communicate with the responsible customer.

2. The system of claim 1, wherein communication data associated with the customer communication further comprises determining that the communication resulted in one or more of no answer, busy signal, or contact with the responsible customer.

3. The system of claim 1, wherein communication data associated with the customer communication further comprises determining an initiator of communication, wherein the initiator is the representative or the responsible customer.

4. The system of claim 1, wherein updating rules for communicating with the responsible customer further comprises identifying a number of communications with the responsible customer within a time period and preventing, based on the rules, future communications with the responsible customer based on the number of communications with the responsible customer within the time period.

5. The system of claim 1, wherein the rules include one or more of:
   entity established restrictions on communications with the one or more responsible customers based on customer location or prior communications; and
   legally established restrictions on communication with one or more responsible customers based on time, place, and manner of communication with the one or more responsible customers; and
   wherein, triggering the rules prevents the representative from communicating with one or more customers.

6. The system of claim 1 further comprising determining the appropriate representative to communicate with one or more responsible customers based at least in part on the appropriate representative's experience and expertise regarding the product with payments in arrears or the responsible customer.

7. The system of claim 1, wherein determining priority of products with payments in arrears is based at least in part on account level variables and scoring metrics wherein account level variables include customer variables disclosed in the customer relationship and scoring metrics include rating the products with payments in arrears in importance of recovery.

8. The system of claim 1, wherein the representative application is an interface presented to the representative based on the representative's experience and expertise regarding the product with payments in arrears or based on an incoming communication from one or more responsible customers.

9. The system of claim 1, wherein the one or more responsible customers are customers that are a primary, secondary, or guarantor for the product with payments in arrears.

10. A non-transitory computer readable medium comprising computer readable program code portions embodied therein, the computer-readable program code portions comprising:
   an executable portion configured for identifying products with payments in arrears and associating the products with payments in arrears with one or more responsible customers;
   an executable portion configured for identifying customer relationships across an entity for the one or more responsible customers and correlate customer relationship data with the one or more responsible customers;
   an executable portion configured for determining recovery priority of products with payments in arrears;
   an executable portion configured for creating a representative application unique to each of the one or more responsible customers, wherein the representative application comprises the identified customer relationship data, the identified products with payments in arrears, and customer contact information for each of the one or more responsible customers;
   an executable portion configured for authorizing an appropriate representative to communicate with one or more responsible parties, wherein the authorization is based at least in part on not triggering a rule that restriction communication with the one or more responsible customers;

an executable portion configured for presenting, automatically, via an interface, the representative application to the representative for a responsible customer, wherein presenting the representative application to the representative is based at least in part on the authorizing of the representative to communicate with the responsible customer;

an executable portion configured for identifying a customer communication and communication data associated with the customer communication, wherein communication data comprises identifying a date, time, and duration of the customer communication;

an executable portion configured for storing the communication data in association with the representative application for the responsible customer; and an executable portion configured for updating rules for communicating with the appropriate customer based on the communication data, wherein the communication data limits the authorization of the appropriate representative to communicate with the responsible customer.

11. The non-transitory computer readable medium of claim 10, wherein communication data associated with the customer communication further comprises determining that the communication resulted in one or more of no answer, busy signal, or contact with the responsible customer.

12. The non-transitory computer readable medium of claim 10, wherein communication data associated with the customer communication further comprises determining an initiator of communication, wherein the initiator is the representative or the responsible customer.

13. The non-transitory computer readable medium of claim 10, wherein updating rules for communicating with the responsible customer further comprises identifying a number of communications with the responsible customer within a time period and preventing, based on the rules, future communications with the responsible customer based on the number of communications with the responsible customer within the time period.

14. The non-transitory computer readable medium of claim 10, wherein the rules include one or more of:
   entity established restrictions on communications with the one or more responsible customers based on customer location or prior communications; and
   legally established restrictions on communication with one or more responsible customers based on time, place, and manner of communication with the one or more responsible customers; and
wherein, triggering the rules prevents the representative from communicating with one or more customers.

15. The non-transitory computer readable medium of claim 10 further comprising an executable portion configured for determining the appropriate representative to communicate with one or more responsible customers based at least in part on the appropriate representative's experience and expertise regarding the product with payments in arrears or the responsible customer.

16. The non-transitory computer readable medium of claim 10, wherein determining priority of products with payments in arrears is based at least in part on account level variables and scoring metrics wherein account level variables include customer variables disclosed in the customer relationship and scoring metrics include rating the products with payments in arrears in importance of recovery.

17. The non-transitory computer readable medium of claim 10, wherein the representative application is an interface presented to the representative based on the representative's experience and expertise regarding the product with payments in arrears or based on an incoming communication from one or more responsible customers.

18. A computer-implemented method communication history tracking for recovering payments in arrears, the method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
      identifying products with payments in arrears and associating the products with payments in arrears with one or more responsible customers;
      identifying customer relationships across an entity for the one or more responsible customers and correlate customer relationship data with the one or more responsible customers;
      determining recovery priority of products with payments in arrears;
      creating a representative application unique to each of the one or more responsible customers, wherein the representative application comprises the identified customer relationship data, the identified products with payments in arrears, and customer contact information for each of the one or more responsible customers;
      authorizing an appropriate representative to communicate with one or more responsible parties, wherein the authorization is based at least in part on not triggering a rule that restriction communication with the one or more responsible customers;
      presenting, automatically, via an interface, the representative application to the representative for a responsible customer, wherein presenting the representative application to the representative is based at least in part on the authorizing of the representative to communicate with the responsible customer;
      identifying a customer communication and communication data associated with the customer communication, wherein communication data comprises identifying a date, time, and duration of the customer communication;
      storing the communication data in association with the representative application for the responsible customer; and
      updating, via a computer processing device, rules for communicating with the appropriate customer based on the communication data, wherein the communication data limits the authorization of the appropriate representative to communicate with the responsible customer.

19. The computer-implemented method of claim 18, wherein communication data associated with the customer communication further comprises determining that the communication resulted in one or more of no answer, busy signal, or contact with the responsible customer.

20. The computer-implemented method of claim 18, wherein communication data associated with the customer communication further comprises determining an initiator of communication, wherein the initiator is the representative or the responsible customer.

21. The computer-implemented method of claim 18, wherein updating rules for communicating with the responsible customer further comprises identifying a number of communications with the responsible customer within a time period and preventing, based on the rules, future communications with the responsible customer based on the number of communications with the responsible customer within the time period.

22. The computer-implemented method of claim 18, wherein the rules include one or more of:
- entity established restrictions on communications with the one or more responsible customers based on customer location or prior communications; and
- legally established restrictions on communication with one or more responsible customers based on time, place, and manner of communication with the one or more responsible customers; and wherein, triggering the rules prevents the representative from communicating with one or more customers.

* * * * *